J. BLANKENBERGER.
FODDER SHOCKER.
APPLICATION FILED MAY 7, 1917.
1,280,378.
Patented Oct. 1, 1918.
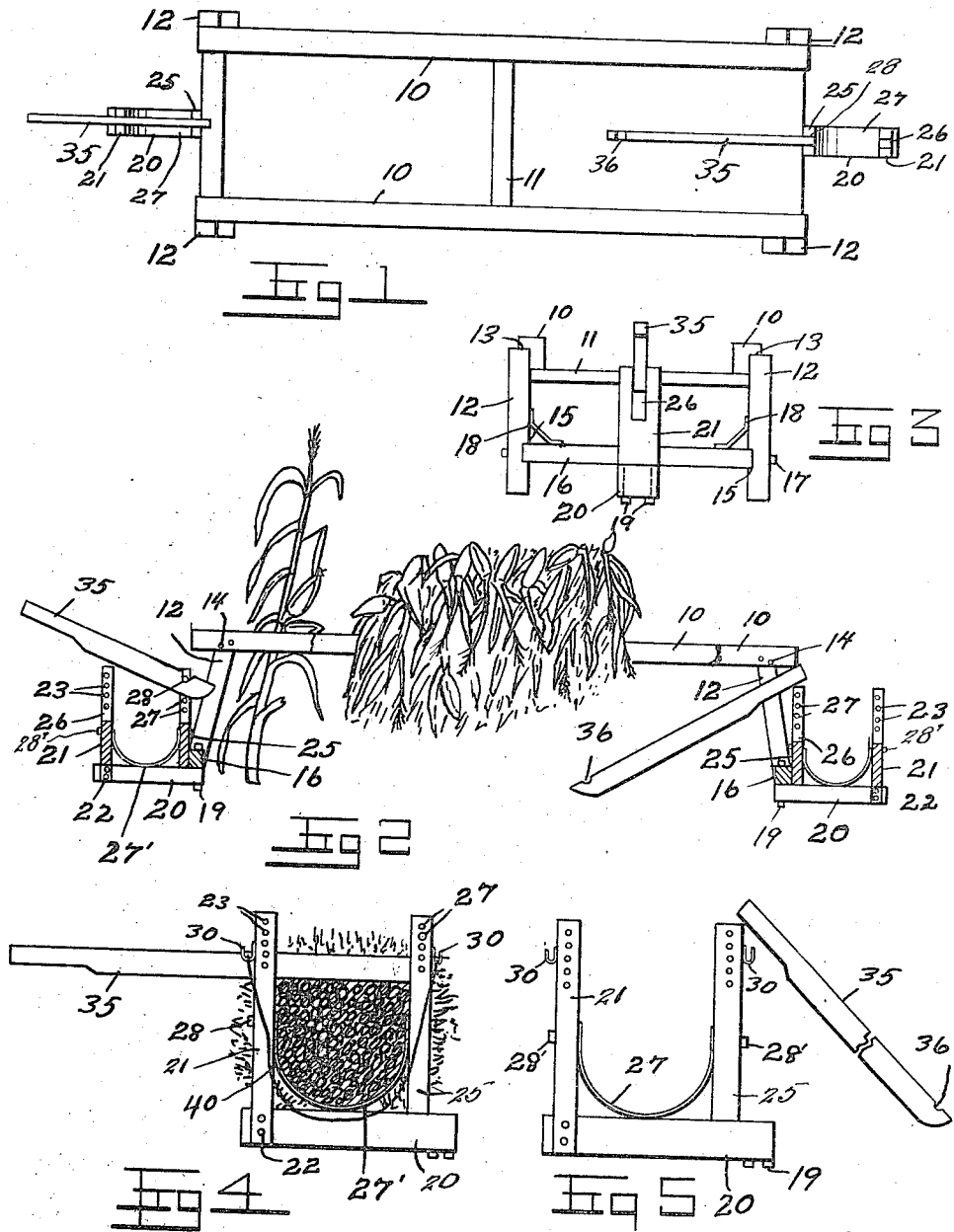
Witnesses
B. E. Wiglesworth
P. H. Pattison
Inventor
J. Blankenberger
By 
Attorney

UNITED STATES PATENT OFFICE.

JOSEPH BLANKENBERGER, OF POSEYVILLE, INDIANA.

FODDER-SHOCKER.

1,280,378.  Specification of Letters Patent.  Patented Oct. 1, 1918.

Application filed May 7, 1917. Serial No. 167,048.

*To all whom it may concern:*

Be it known that I, JOSEPH BLANKENBERGER, a citizen of the United States, residing at Poseyville, in the county of Posey, State of Indiana, have invented certain new and useful Improvements in Fodder-Shockers; and I do hereby declare the following to be a full, clear, and exact description of the invention, such as will enable others skilled in the art to which it appertains to make and use the same.

This invention relates to new and useful improvements in fodder shockers, and has for its primary object to provide a device of this character by means of which fodder may be tied into bundles after the ears of corn have been removed therefrom.

Referring to the drawings,

Figure 1, is a top plan view,

Fig. 2, is a longitudinal sectional view,

Fig. 3, is an end view,

Fig. 4, is a detail view showing a portion of the device in operative position, and Fig. 5, is a similar view showing a portion of the device in its operative position.

Referring more particularly to the drawings, the device comprises two parallel members 10 which are held in spaced relation by means of a transversely extending brace 11, and connected to each of the members 10 near their ends are depending legs 12, the side members 10 being notched out as at 13 to receive the legs 12, bolts 14 being employed to secure the legs 12 to the members 10. The legs 12 are notched out as at 15 to receive transversely extending braces 16 which are secured by means of screws or the like 17, these transverse braces 16 being provided with corner braces 18 by which the legs are strengthened.

Secured to each of the braces 16 intermediate of their ends by means of bolts or the like 19 is a bar 20, and extending upwardly from the said bar near its outer end is a standard 21, said standard being secured to the member 20 by means of bolts 22. This standard has a plurality of spaced openings 23 the purpose of which will be hereinafter described. Secured to the outer face of each of the braces 16 and extending vertically therefrom is a member 25 the upper end of which is bifurcated as at 26, and the furcations of the bifurcated member are provided with a plurality of spaced openings 27 through which a bolt 28 is adapted to pass. Extending downwardly from each of the members 21 and 25, and having its bottom engaging with the member 20 is a curved metal cradle 27, this cradle being secured as at 28' to the member 25. Each of the members 21 and 25 are provided with hooks 30 the purpose of which will be hereinafter described.

In operation, the bundles of corn are positioned transversely of the parallel members 10, and as the ears of corn are removed, the fodder is placed in the cradle 27. When this cradle has become filled to the desired amount, a lever 35 having a groove 36 is adapted to be engaged with the bolt 28 carried by the member 25, and by exerting pressure upon the outer end of said lever, the fodder will be compressed in the cradle 27. A piece of twine or cord 40 which has previously been placed in the cradle 27 and has its ends engaged in the hooks 30 is then tied around the bundle of fodder and the lever is released whereupon the bundle of fodder is free to be removed from the cradle 27. When the cradles 27 are receiving the fodder, the lever 35 may be moved to the position shown in Fig. 4.

From the foregoing it will be seen that the present invention provides a device by means of which fodder may be tied in bundles in an expeditious manner and with great saving of labor.

Having thus described the invention, what is claimed is:

A device of the character described comprising a portable fodder support having substantially U shaped end legs, a bundling cradle carried by each end leg, vertical uprights on opposite sides of each cradle and having furcated upper ends, said uprights being formed with a plurality of holes disposed transversely the furcated ends, a pin detachably engageable in any one of the holes, and a lever having a fulcrum seat for engaging the pin and adapted to be disposed for swinging movement in the furcated ends of said uprights to bridge the cradle crosswise thereof for compressing material therein, the uprights being of a height less than the height of the support.

In testimony whereof I affix my signature in the presence of two witnesses.

JOSEPH BLANKENBERGER.

Witnesses:
 JOHN R. RABEN,
 GEORGE KNAPP.

Copies of this patent may be obtained for five cents each, by addressing the "Commissioner of Patents, Washington, D. C."